(12) United States Patent
Debernardi et al.

(10) Patent No.: US 10,408,239 B2
(45) Date of Patent: Sep. 10, 2019

(54) MULTIPLE COUPLING MANIFOLD FOR QUICK COUPLING

(71) Applicant: Faster S.P.A., Rivolta d'Adda (IT)

(72) Inventors: Enrico Carlo Debernardi, Rivolta d'Adda (IT); Paolo Rusconi, Rivolta d'Adda (IT)

(73) Assignee: Faster S.P.A., Rivolta d'Adda (IT)

(*) Notice: Subject to any disclaimer, the term of this patent is extended or adjusted under 35 U.S.C. 154(b) by 0 days.

(21) Appl. No.: 15/376,230

(22) Filed: Dec. 12, 2016

(65) Prior Publication Data

US 2017/0175783 A1 Jun. 22, 2017

(30) Foreign Application Priority Data

Dec. 16, 2015 (EP) .................................. 15200504

(51) Int. Cl.
*F15B 13/08* (2006.01)
*F16L 37/56* (2006.01)
*F16L 55/07* (2006.01)

(52) U.S. Cl.
CPC .......... *F15B 13/0814* (2013.01); *F16L 37/56* (2013.01); *F16L 55/07* (2013.01); *Y10T 137/87877* (2015.04)

(58) Field of Classification Search
CPC ....... F15B 13/0814; F16L 55/07; F16L 37/56; F16L 41/03; Y10T 137/87885; Y10T 137/87877; Y10T 137/9029
USPC .......... 137/884, 883, 798; 285/122.1, 124.1, 285/124.5
See application file for complete search history.

(56) References Cited

U.S. PATENT DOCUMENTS

| 6,047,729 | A | * | 4/2000 | Hollister | ............... F17C 13/025 137/557 |
|---|---|---|---|---|---|
| 2004/0030372 | A1 | | 2/2004 | Ellingboe et al. | |
| 2004/0144436 | A1 | | 7/2004 | Zeiber et al. | |
| 2009/0051161 | A1 | * | 2/2009 | Ekstrom | ................. F16L 37/32 285/29 |
| 2011/0254265 | A1 | * | 10/2011 | Rusconi | ................. F16L 37/32 285/317 |

FOREIGN PATENT DOCUMENTS

| EP | 1538708 A2 | 6/2005 |
|---|---|---|
| EP | 2378177 A1 | 10/2011 |

* cited by examiner

*Primary Examiner* — Michael R Reid
(74) *Attorney, Agent, or Firm* — Stetina Brunda Garred & Brucker

(57) ABSTRACT

The present invention relates to a multiple coupling manifold comprising a plurality of housings configured to accommodate an equal number of hydraulic couplings.

The manifold according to the invention is characterized in that it comprises first and second hydraulic connection means configured to hydraulically connect said manifold to the hydraulic circuit present on the machine once the manifold is mounted on the machine, and is further characterized in that it comprises a first hydraulic connection pipe, which connects said first hydraulic connection means to a first and a second of said housings, and a second hydraulic connection pipe, which connects said second hydraulic connection means to a third and a fourth of said housings.

13 Claims, 4 Drawing Sheets

Sez. C-C

MULTIPLE COUPLING MANIFOLD FOR QUICK COUPLING

CROSS REFERENCE TO RELATED APPLICATION(S)

The present application claims priority to European Patent Application No. 15200504.7 filed Dec. 16, 2015, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a multiple coupling manifold for quick couplings, of the type comprising a plurality of quick couplings.

More in particular, the manifold for quick couplings according to the present invention allows to connect a plurality of hydraulic lines of different size onto a single manifold.

By virtue of the manifold, according to the present invention, it is possible to wire only two lines on machine side, thus simplifying the hydraulic circuit on the machine.

In particular, the manifold according to the present invention was designed for use on earth-moving machines, however the invention is not limited to a specific application

PRIOR ART

Systems are known in the sector which allow the manual coupling between a support manifold, which generically accommodates a plurality of male or female couplings of the cartridge type, and one or more hydraulic lines provided with corresponding female or male couplings of type suitable to be connected to said cartridges.

The manifold is mounted on the machine and hydraulically connected to the pressurized oil hydraulic circuit which are found on the machine, while the users are connected to the manifold through the hydraulic lines provided with male or female couplings.

The couplings which are accommodated in the support manifold are named "cartridge-type" because they must be integrated in the housing provided in the manifold for this purpose in order to operate, because the oil flow has non-exclusively axial components with respect to the coupling, and thus the support manifold is concerned by the flow itself.

In general, the manifolds of type known in the prior art accommodate two cartridges or in all cases a number of cartridges equal to the number of hydraulic connection lines between manifold and machine.

The disadvantages which penalize the manifolds of type known in the prior art thus include the limited number of couplings that they can accommodate, the complication of the hydraulic system on the machine which must envisage a plurality of lines to be connected to the manifold, and the impossibility of modifying the position of the cartridges in the coupling.

SUMMARY OF THE INVENTION

It is a task of the present invention to overcome the versatility limits of the systems of known type in the prior art.

In the scope of such a task, it is the object of the present invention to provide a support manifold suitable to be connected to two hydraulic lines of the hydraulic circuit on the machine and which comprises at least two hydraulic lines of different size.

It is a further object of the present invention to provide a support manifold able to accommodate at least one cartridge and one coupling on each hydraulic line.

Again, it is the object of the present invention to provide a support manifold which comprises on each of said lines decompression means suitable to decompress both the cartridge and the coupling present on said line.

In view of the above, according to an embodiment of the present invention there is provided a multiple coupling manifold comprising a plurality of housings configured to accommodate an equal number of hydraulic couplings, wherein said manifold comprises first and second hydraulic connection means configured to hydraulically connect said manifold to the hydraulic circuit present on a machine, and wherein said manifold further comprises a first hydraulic connection pipe which connects said first hydraulic connection means to a first and a second of said housings, and a second hydraulic connection pipe which connects said second hydraulic connection means to a third and a fourth of said housings, said manifold comprising further decompression means comprising at least one draining line in fluid connection with said first or second hydraulic connection pipe and at least one further hydraulic connection line which puts into fluid connection said first housing and said second housing.

According to an embodiment, said plurality of housings comprise a first housing, a second housing, a third housing and a fourth housing, at least said first and second housings being configured to accommodate cartridge connection means provided with a decompression system.

According to an embodiment, said third housing is configured to accommodate a female coupling free from decompression system and said fourth housing is configured to accommodate a male coupling free from decompression system.

According to an embodiment, said decompression means comprise at least one draining channel which hydraulically connects said first housing to said second housing for said first and second cartridges.

According to an embodiment, said decompression means further comprise at least one draining coupling placed on said draining channel for discharging the pressurized fluid.

Further disclosed is a system for the simultaneous connection of multiple lines, comprising a manifold according to any one of the above summarized embodiments along with a first cartridge inserted in said first housing, a second cartridge inserted in said second housing, a flat-face female coupling inserted in said third housing and a flat-faced male coupling inserted in said fourth housing.

According to an embodiment, said first and second cartridges comprises a decompression device configured to discharge pressurized fluid from the cartridge to the draining channel.

This task and the other objects which will be more apparent from the description below are achieved by a support manifold comprising a plurality of quick couplings as claimed in the accompanying claims which form an integral part of the present description.

BRIEF DESCRIPTION OF THE FIGURES

Further features and advantages of the present invention will be more apparent from the following detailed description, provided by way of non-limitative example and illustrated in the accompanying figures, in which.

DETAILED DESCRIPTION OF THE INVENTION

A preferred embodiment of the female cartridge-type coupling according to the present invention will be illustrated in the following description.

Such a description is provided by way of non-limiting example, thus all variants of that described which may be considered equivalent should be considered as falling in the scope of the present invention.

Figure 1:
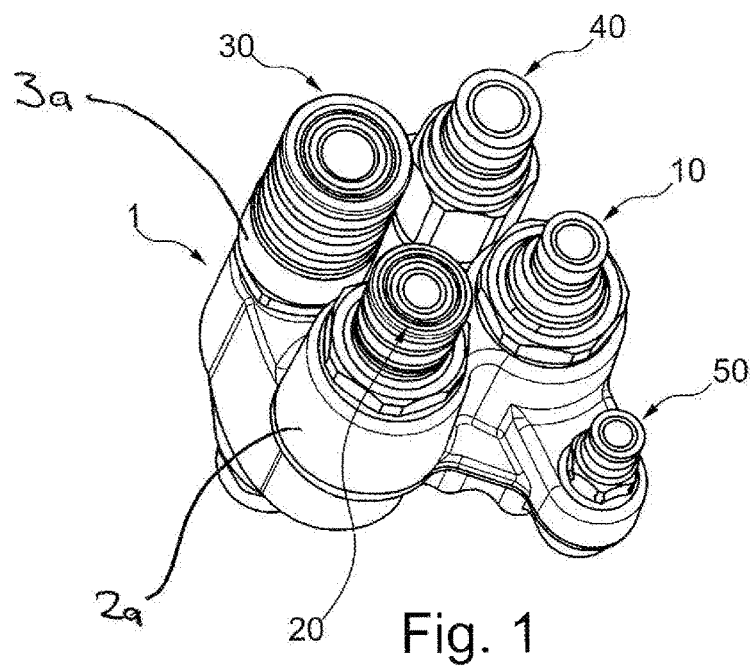
FIG. 1 shows an overall perspective view of a multiple coupling manifold according to the present invention.
Figure 2:
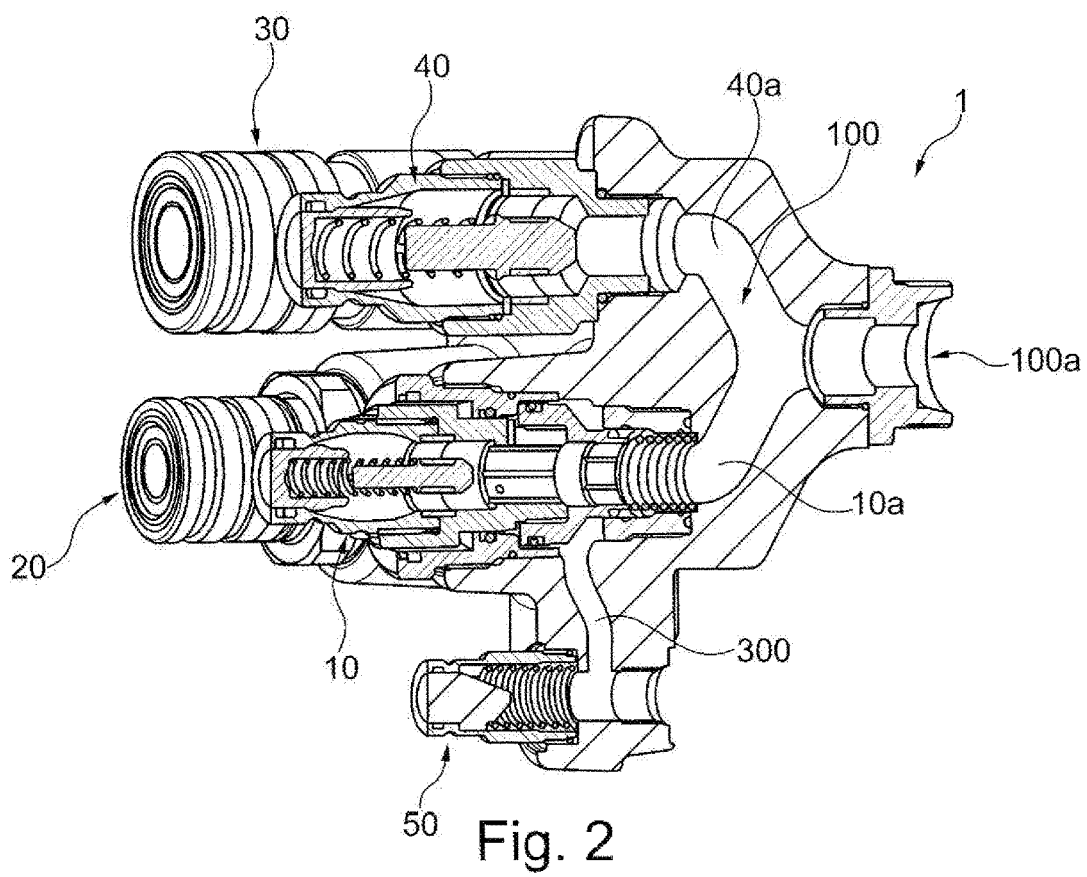
FIG. 2 shows a partial section view of the multiple coupling manifold according to the present invention.
Figure 3:
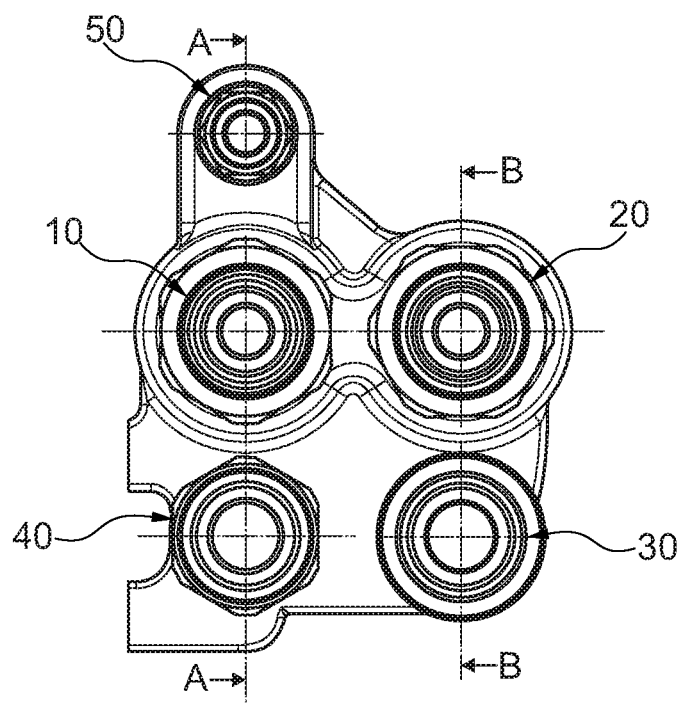
FIG. 3 shows a front view of the manifold according to the present invention.

In general, with particular reference to FIG. 1, a support manifold 1 according to the present invention consists of a manifold made of cast-iron or similar metallic material and comprises a plurality of housings configured to accommodate a quick coupling each.

More specifically and with reference to the preferred embodiment of the present invention illustrated in the accompanying drawings, the manifold 1 according to the present invention comprises four quick couplings. In particular, with reference to FIG. 1, the manifold according to the present invention comprises four housings, a first housing 1a, a second housing 2a, a third housing 3a and a fourth housing 4a in which an equal number of quick couplings 10, 20, 30, 40 may be inserted.

Preferably, said couplings comprise a first cartridge, which may be of male or female type 10, a second cartridge 20 (a female cartridge is shown in the figure), a first flat-face coupling 30 (a female coupling is shown by way of example in the figure) and a second coupling 40 (a flat-face male coupling is shown in the figure).

The manifold 1 according to the present invention further comprises first 100a and second 200a hydraulic connection means for hydraulically connecting the manifold to the hydraulic circuit present on the machine once the manifold is mounted on the machine.

Figure 5:
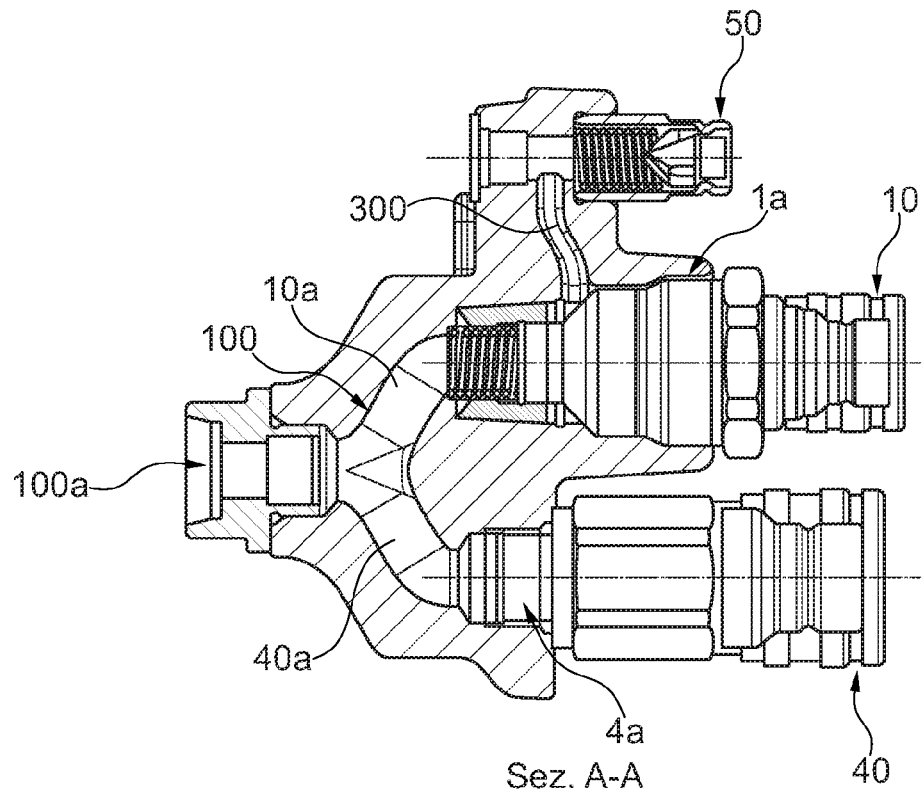
FIG. 5 shows a section view taken along a vertical plane A-A in FIG. 3.
Figure 6:
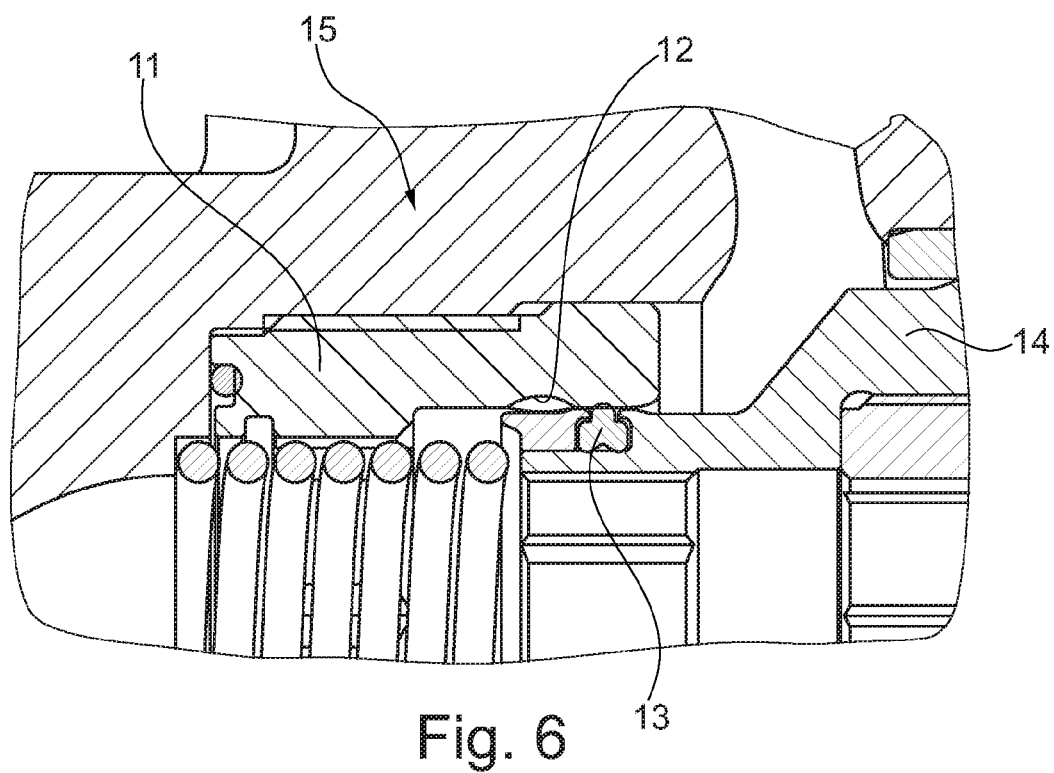
FIG. 6 shows an enlarged detail of the decompression device with which the cartridges inserted in the manifold according to the present invention are provided.
Figure 7:
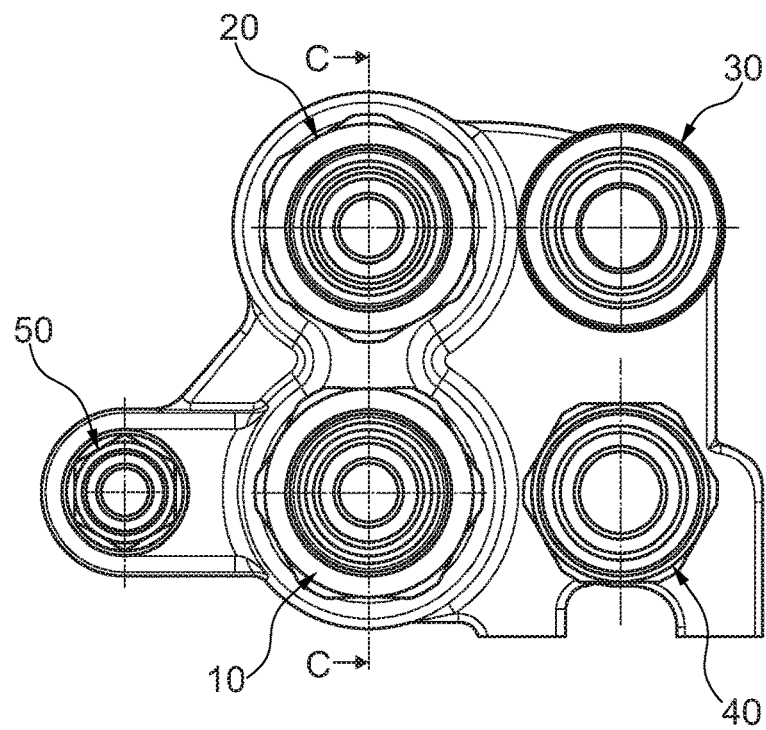
FIG. 7 shows a front view of the manifold according to the present invention on which a plane C-C is identified.
Figure 8:
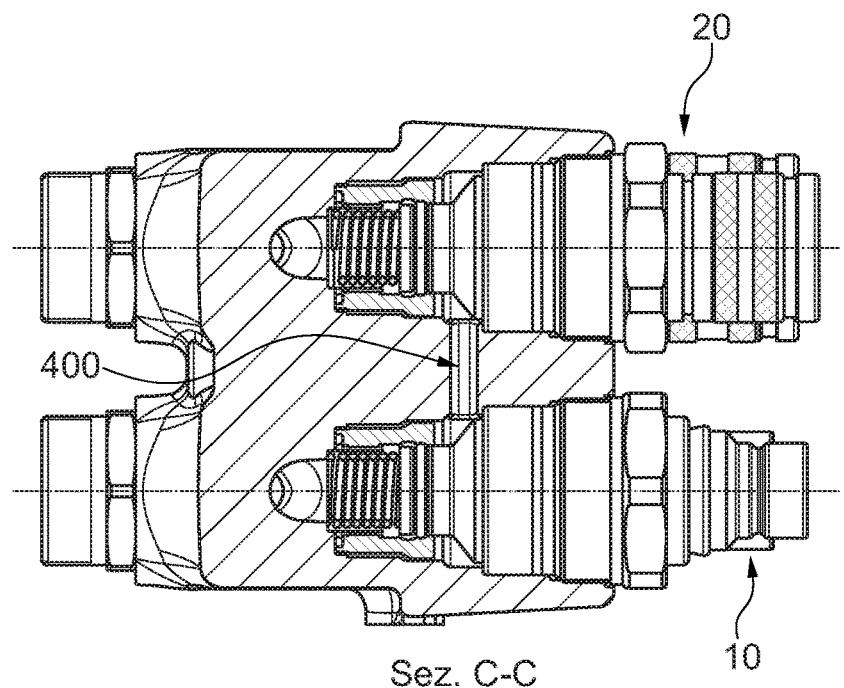
FIG. 8 shows a section view taken along the plane C-C in FIG. 7 of the manifold according to the present invention.

Furthermore, with reference to the section A-A in FIG. 5, the manifold 1 according to the present invention has a first hydraulic connection pipe 100, which hydraulically connects said first hydraulic connection means 100a to said first cartridge 10 and said flat-face male coupling 40.

In order to make such a hydraulic coupling, said first connection pipe 100 advantageously comprises a first stretch 10a, which ends at said first housing 1a adapted to accommodate said first cartridge 10, and a second stretch 40a, which ends at said fourth housing 4a adapted to accommodate said flat-face male coupling 40.

Figure 4:
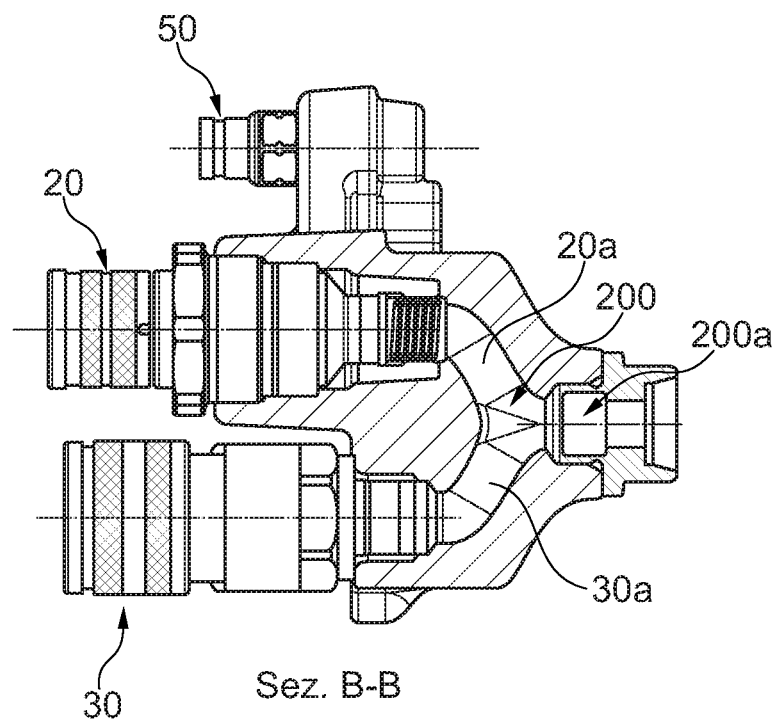
FIG. 4 shows a section view taken along a vertical plane B-B in FIG. 3.

Similarly, with reference to section B-B in FIG. 4, the manifold 1 according to the present invention further comprises a second hydraulic connection pipe 200, which connects said second hydraulic connection means 200a to said second cartridge 20 and said flat-face female coupling 30.

In order to make such a hydraulic connection, said second coupling pipe 200 advantageously comprises a first stretch 20a, which ends at said second housing 2a adapted to accommodate said second cartridge 20, and a second stretch 30a, which ends at said third housing 3a adapted to accommodate said flat-face female coupling 30.

Thus, according to the preferred embodiment shown in the accompanying figures, the manifold according to the present invention allows to wire only two hydraulic lines on the machine, typically an earth-moving machine of the "skid steer" type, which hydraulic lines to be connected to said first 100a and second 200a hydraulic connection means which allow the introduction of fluid into the manifold, and to connect four lines.

The embodiment illustrated by way of example in the accompanying figures shows a manifold suitable to connect four lines, but it is understood that other manifolds suitable to connect more than four lines may be manufactured in the scope of the present invention, and thus the present invention as described and claimed here in the appended claims should in no manner be understood as limited to a manifold comprising four lines.

The manifold 1 according to the present invention is able to simplify the hydraulic system needed on the machine and the connections needed to connect such a circuit to the manifold itself, although in the presence of a plurality of couplings.

Again with reference to the accompanying figures, the manifold 1 according to the present invention is further characterized by a high versatility because said first housing 1a for said first cartridge 10 and said second housing 2a for said second cartridge 20 are identical, and thus allow to exchange the position of the cartridges.

Similarly, the female 30 and male 40 couplings are respectively connected to the manifold 1 at said third housing 3a and said fourth housing 4a, which are identical and thus allow to exchange the position of the couplings.

Preferably, and as shown by way of example in the accompanying drawings, said first housing 1a and said second housing 2a are positioned in the lower part of the manifold and are configured to accommodate half inch (½") cartridges.

Again by way of example, said third housing 3a and said fourth housing 4a are positioned in the upper part of the manifold and are configured to accommodate ¾" couplings.

As already specified with reference to the number of connectable lines, also with regards to the dimensions of the couplings supported by the manifold, it is emphasized that the dimensions provided above are given by way of non-limiting example of the present invention only, and should in no manner be understood as limited to particular sizes of couplings and/or cartridges.

The manifold 1 according to the present invention comprises decompression means comprising a draining line 300, preferably on said first hydraulic connection pipe 100, and a hydraulic coupling line 400, which hydraulically connects said first housing 1a of said first cartridge 10 to said second housing 2a of said second cartridge 20. Thus formed, said decompression means allow to simultaneously decompress the hydraulic line comprising the cartridge and the coupling hydraulically connected to said cartridge, and to drain the working fluid through a single draining line 300.

The draining line 300 allows to drain the pressurized working fluid, typically oil, from said first 10 and second cartridge 20. A draining coupling 50 is conveniently provided on said draining line 300.

The draining channel 300 puts into fluid connection the first housing 1a and the second housing 2a in which the cartridges 10 and 20 are inserted, which are provided each with a decompression device 15, e.g. comprising an adapter body 11 which provides fluid-tightness against a seal 13 integral with the rear body 14 of the cartridge. The adapter body 11 is advantageously provided with decompression recesses 12, so that the oil is discharged and drained from the draining channel 300 when such decompression recesses 12 are at said seal 13.

Advantageously, the draining channel 300 allows to drain the oil from the reservoir present on the machine and to retrieve it completely.

The operation of the manifold 1 according to the present invention is thus as follows.

The user can decompress each of the two lines by means of the decompression device 15 present on said cartridges when a first cartridge 10 and a second cartridge 20, hydraulically connected by means of said first 100 and second 200 hydraulic connection pipes respectively to said male coupling 40 and to said female coupling 30 are inserted in the manifold 1, and pressurized fluid coming from the first 100a and from the second 200a hydraulic connection means which hydraulically connect the manifold 1 to the hydraulic circuit on the machine is present in the manifold and in the couplings.

In particular, by pressing the cartridge, e.g. the first cartridge 10 with reference to FIG. 5, the decompression device 15 provided on the cartridge itself discharges the pressure through the draining line 300.

The pressure is discharged from the entire line, and thus also from the male coupling, by discharging the pressure from the cartridge 10, by effect of the hydraulic connection formed by the first coupling pipe 100 comprising the first stretch 10a, which is hydraulically connected to the first cartridge 10, and a second stretch 40a, which is hydraulically connected to the male coupling 40.

Similar is the operation of the decompression system on the second line, i.e. on the line 200 to which said second cartridge 20 and said female coupling 30 are connected.

By virtue of the hydraulic coupling line 400, which puts into fluid connection said first housing 1a of said first cartridge 10 and said second housing 2a of said second cartridge 20, the working fluid may be discharged through the draining line 300 by decompressing the cartridge 20.

The manifold 1 according to the present invention thus achieves the predetermined tasks and objects, with particular reference to simplicity of use and greater compactness, above all when it is considered that the manifold incorporates a decompression system which allows the selective decompression of the hydraulic lines provided therein.

The invention claimed is:

1. A system for the connection of multiple hydraulic lines, said system comprising a multiple coupling manifold comprising a plurality of at least four housings and a corresponding plurality of hydraulic couplings each accommodated in one of said housings, the plurality of hydraulic couplings defining a polygonal footprint, said hydraulic couplings comprising a first hydraulic coupling of the cartridge type accommodated in a corresponding first housing and a second hydraulic coupling of the cartridge type accommodated in a corresponding second housing, said manifold comprising first and second hydraulic connection means configured to hydraulically connect said manifold to a hydraulic circuit present on a machine, wherein said manifold further comprises a first hydraulic connection pipe, which connects said first hydraulic connection means to said first housing and a fourth housing of said housings, and a second hydraulic connection pipe, which connects said second hydraulic connection means to said second housing and a third housing of said housings, said system further comprising decompression means, at least a portion of which is positioned outside of the polygonal footprint, said decompression means comprising at least one draining channel in fluid connection with said first or second hydraulic connection pipe and at least one hydraulic connection line, which puts into fluid connection said first housing and said second housing, and wherein each of said cartridge type couplings is provided with a decompression device comprising an adapter body which provides fluid-tightness against a seal integral with a rear body of the cartridge, and in that the adapter body is provided with decompression recesses, so that fluid is discharged and drained from the draining channel when such decompression recesses are at said seal.

2. The system according to claim 1, wherein said third housing is configured to accommodate a female coupling not directly connected to the decompression means and said fourth housing is configured to accommodate a male coupling not directly connected to the decompression means.

3. The system according to claim 1, wherein said at least one draining channel is in fluid connection with said at least one hydraulic connection line.

4. The system according to claim 2, wherein said at least one draining channel is in fluid connection with said first hydraulic connection pipe.

5. The system according to claim 1, wherein said decompression means further comprise at least one draining coupling placed on said at least one draining channel for discharging the pressurized fluid.

6. The system according to claim 2, wherein said decompression means further comprise at least one draining coupling placed on said at least one draining channel for discharging the pressurized fluid.

7. The system according to claim 3, wherein said decompression means further comprise at least one draining coupling placed on said draining channel for discharging the pressurized fluid.

8. The system according to claim 4, wherein said decompression means further comprise at least one draining coupling placed on said draining channel for discharging the pressurized fluid.

9. A system for the simultaneous connection of multiple lines, comprising a manifold according to claim 1 and a flat-face female coupling inserted in said third housing and a flat-faced male coupling inserted in said fourth housing.

10. The system of claim 1, wherein the multiple coupling manifold allows for connection to a plurality of hydraulic lines of different size.

11. The system according to claim 10, wherein said decompression means further comprise at least one draining coupling placed on said at least one draining channel for discharging the pressurized fluid.

12. The system of claim 1, wherein at least one housing includes at least three separate flow paths extending therefrom.

13. The system of claim 12, wherein the at least three separate flow paths include the first hydraulic connection pipe, the at least one draining channel and the at least one hydraulic connection line.

* * * * *